(12) United States Patent
Sawatzki et al.

(10) Patent No.: US 11,207,957 B2
(45) Date of Patent: Dec. 28, 2021

(54) CRASH STRUCTURE FOR A MOTOR VEHICLE

(71) Applicant: Ford Global Technologies, LLC, Dearborn, MI (US)

(72) Inventors: Marius Sawatzki, Pulheim/NRW (DE); Daniel Meckenstock, Wuppertal/NRW (DE); Stefan Schneider, Rösrath/NRW (DE); Dominik Mueller, Euskirchen/NRW (DE); Joergen Hilmann, Leverkusen/NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/108,043

(22) Filed: Dec. 1, 2020

(65) Prior Publication Data

US 2021/0163071 A1 Jun. 3, 2021

(30) Foreign Application Priority Data

Dec. 2, 2019 (DE) .......................... 102019218665.3

(51) Int. Cl.
*B60J 5/04* (2006.01)
*B62D 25/04* (2006.01)
*B62D 21/15* (2006.01)

(52) U.S. Cl.
CPC .......... *B60J 5/0461* (2013.01); *B60J 5/0431* (2013.01); *B60J 5/0456* (2013.01); *B60J 5/0462* (2013.01); *B62D 21/157* (2013.01); *B62D 25/04* (2013.01)

(58) Field of Classification Search
CPC ...... B60J 5/0431; B60J 5/0456; B60J 5/0458; B60J 5/0461; B60J 5/0462; B62D 21/15; B62D 21/157

USPC ............................ 296/187.09, 187.1, 146.11
See application file for complete search history.

(56) References Cited

U.S. PATENT DOCUMENTS

| 2016/0016612 A1 | 1/2016 | Torikawa et al. |
| 2016/0039466 A1 | 2/2016 | Yamamoto et al. |
| 2016/0194031 A1 | 7/2016 | Yamamoto et al. |
| 2019/0256149 A1 | 8/2019 | Peru |

FOREIGN PATENT DOCUMENTS

| DE | 102011109349 A1 | 5/2012 |
| DE | 102012010403 A1 | 5/2013 |
| DE | 102015007453 A1 | 12/2016 |
| DE | 102018105803 A1 | 9/2018 |
| DE | 102015110304 B4 | 5/2019 |
| EP | 3572251 A1 | 11/2019 |
| WO | 2005110815 A1 | 11/2005 |

OTHER PUBLICATIONS

DE Search Report dated Aug. 3, 2020 re Appl. No 10 2019 281 665.3; Original version and computerized English translation.

*Primary Examiner* — Dennis H Pedder
(74) *Attorney, Agent, or Firm* — Raymond L. Coppiellie; Bejin Bieneman PLC

(57) ABSTRACT

The disclosure relates to a crash structure for a motor vehicle, the crash structure being, in a starting state, at a minimum spacing of greater than zero from a door hinge of a vehicle door of the motor vehicle, and the crash structure being in contact with at least one contact region which is assigned to the door hinge in a crash state after a partial overlap crash by way of passing into an operative connection with a wheel of the motor vehicle, and forming a deflector surface for the deflection of the wheel.

15 Claims, 8 Drawing Sheets

CRASH STRUCTURE FOR A MOTOR VEHICLE

CROSS-REFERENCE TO RELATED APPLICATION

This patent application claims priority to German Application No. DE 102019218665.3 filed on Dec. 2, 2019, which is hereby incorporated by reference in its entirety.

BACKGROUND

The disclosure relates to a crash structure for a motor vehicle. Furthermore, the disclosure relates to a motor vehicle with a crash structure of this type.

In addition to active safety devices, current motor vehicles, such as passenger cars, also have passive safety devices, such as crumple zones, safety belts, airbags and belt tensioners. They are intended to increase the safety of the motor vehicle in a crash. Here, the safety in a crash is understood to mean the capability of protecting persons in the case of accidents. To this end, crash tests are carried out, that is to say collision tests of motor vehicles under realistic controlled conditions.

In the case of certain frontal impact crash tests, a motor vehicle is propelled under defined conditions against a stationary rigid or deformable obstacle. Furthermore, motor vehicle on motor vehicle crashes or collisions with pedestrians can also be simulated. The effects are detected by way of numerous sensors and by way of recordings using high speed cameras.

Depending on the test design, a very wide variety of crash situations can thus be simulated (for example, impact with a tree, collision with other motor vehicles in a frontal, lateral or rear orientation and with varying overlap). In the case of crash tests in accordance with the SORB (Small Overlap Rigid Barrier) protocol developed by IIHS (Insurance Institute for Highway Safety), an overlap of a barrier as a portion of the motor vehicle width is provided.

In the case of the collision, the wheel which is involved on the impact side of the motor vehicle is loaded and can be pressed into the wheel arch of the motor vehicle in the direction of the A-pillar. If the wheel makes contact with the wheel arch, a load path leads into a flange of a bulkhead and/or into a lower door hinge of a vehicle door of the motor vehicle. Depending on the loading, flange spot welds can open and/or the wheel passes into the passenger compartment of the motor vehicle and/or a door hinge of the vehicle door is damaged, as a result of which the vehicle door can be deformed and the interior compartment or occupant area is made accessible to deformed parts of the motor vehicle.

DE 10 2012 010 403 A1 has disclosed a crash structure for a motor vehicle, which crash structure has a deformation element in the region of a wheel arch, which deformation element enables a wheel movement in a deactivated state and dissipates crash energy in an activated state. In the activated state, the deformation element forms a deflection group with at least one deflection bevel, the at least one deflection bevel being oriented at a predefined angle with respect to the vehicle longitudinal direction and deflecting the penetrating object in said predefined direction.

WO 2005/110815 A1 has disclosed a deflector apparatus in the case of a partial overlap frontal collision of a motor vehicle. The deflector apparatus is arranged in front of a front wheel of the motor vehicle. In order to pivot the front wheel safely inward in the case of a collision, it forms a kinematic chain, the coupler of which is a deflector which, in the case of the action of a frontal impact, is pivoted rearward and is moved toward the outer side of the vehicle. The kinematic chain is a thrust crank mechanism, consisting of a swing arm which can be pivoted about a bearing, of a further bearing, of a sliding guide and of the coupler which is connected to the outer end of the swing arm at a point of articulation and is guided in the further bearing.

Furthermore, the use of a bracket element is known, which is screwed to parts on both sides of a flange. In the case of loading of the flange by way of the wheel, the flange is secured by the bracket element and cannot be opened.

If the flange remains stable after the wheel impact and does not open, the wheel rotates in accordance with a possible strategy for the reduction of accident damage for the SORB load case. In the present case, it is provided in accordance with the strategy for the reduction of accident damage that the wheel is moved out of its wheel arch, in order thus to ensure that the evaluations to be achieved in accordance with the IIHS protocol of structure measurement points and occupant values are achieved. The wheel is moved along the lower door hinge region, it being possible for the lower door hinge of the vehicle door to be loaded and deformed.

SUMMARY

The object of the disclosure is achieved by way of a crash structure for a motor vehicle, the crash structure being, in a starting state, at a minimum spacing of greater than zero from a door hinge of a vehicle door of the motor vehicle, and the crash structure being in contact with at least one contact region which is assigned to the door hinge in a crash state after a partial overlap crash by way of passing into an operative connection with a wheel of the motor vehicle, and forming a deflector surface for the deflection of the wheel.

In other words, in the case of a crash, the crash structure is deformed by the wheel when the wheel acts on the crash structure as a consequence of the crash. The deformation of the crash structure is limited by way of the door hinge, that is to say when the crash structure comes into contact with the at least one contact region. In this deformed state due to the crash, the crash element configures a deflector surface which deflects the wheel laterally in such a way that it is moved laterally out of a wheel arch of the wheel without stopping said movement. The door hinge is thus protected by way of the crash structure and cannot be sheared off by the wheel, regardless of the size of the latter. Furthermore, a deformation of the crash structure is caused by way of the wheel itself.

In accordance with a further embodiment, the crash structure has a main direction of extent which extends substantially toward the outside in the vehicle width direction. In other words, the crash structure has an elongate basic shape and is arranged transversely with respect to the traveling direction of the motor vehicle. Here, substantially is understood to mean deviations of up to 45° from the vehicle width direction. One free end of the crash structure is arranged on the outer side of the vehicle, and a further end of the crash structure is connected to the motor vehicle on the inner side of the vehicle. A deflector surface can be formed in a particularly simple manner by way of deforming of the end on the outer side of the vehicle.

In accordance with a further embodiment, the main direction of extent is arranged at an angle of from 100° to 130° in relation to the A-pillar in the starting state. Here, the A-pillar is understood to mean the connection between a vehicle roof and a front bulkhead of the motor vehicle. The A-pillar configures a plane on the outer side of the vehicle in sections, the perpendicular vector of which plane extends substantially in the vehicle width direction.

In accordance with a further embodiment, it is possible for the crash structure to be moved out of the starting state into the crash state by way of a pivoting movement about a vehicle vertical axis of the motor vehicle. In other words, after the wheel has passed into contact with the crash structure, said wheel is pivoted or rotated. A deflector surface can thus be formed in a particularly simple way by way of deforming.

In accordance with a further embodiment, the crash structure has at least one spacer element which has a main direction of extent which extends substantially in the vehicle longitudinal direction in the starting state. Here, substantially is understood to mean deviations of up to 45° from the vehicle longitudinal direction. The at least one spacer element is therefore arranged in such a way that, in the case of a crash, it first of all comes into contact with at least one contact region which is assigned to the door hinge, to be precise on sections which are provided for this purpose. Damage of the door hinge can thus be counteracted in the case of a crash.

In accordance with a further embodiment, the at least one spacer element has a frustoconical basic shape. The at least one spacer element can thus be configured such that it is particularly robust and can be deformed only with difficulty in the case of a crash.

In accordance with a further embodiment, the crash structure is fastened to an A-pillar of the motor vehicle. In the case of a crash, the crash element can thus deflect a front wheel out of the wheel arch, with the result that it does not penetrate into the passenger compartment of the motor vehicle.

In accordance with a further embodiment, the crash structure is joined to a bracket element. In the case of a crash, the bracket element connects and protects, for example, a flange of the motor vehicle, such as a first, inner section to a second, outer section of an A-pillar of the motor vehicle. A dual function is thus achieved, namely the protection of the door hinge and the protection of a connection between the first and second section of the A-pillar are improved.

Furthermore, a motor vehicle with a crash structure of this type belongs to the disclosure.

BRIEF DESCRIPTION OF THE DRAWINGS

The disclosure will now be described on the basis of a drawing, in which.

DETAILED DESCRIPTION

Figure 1:
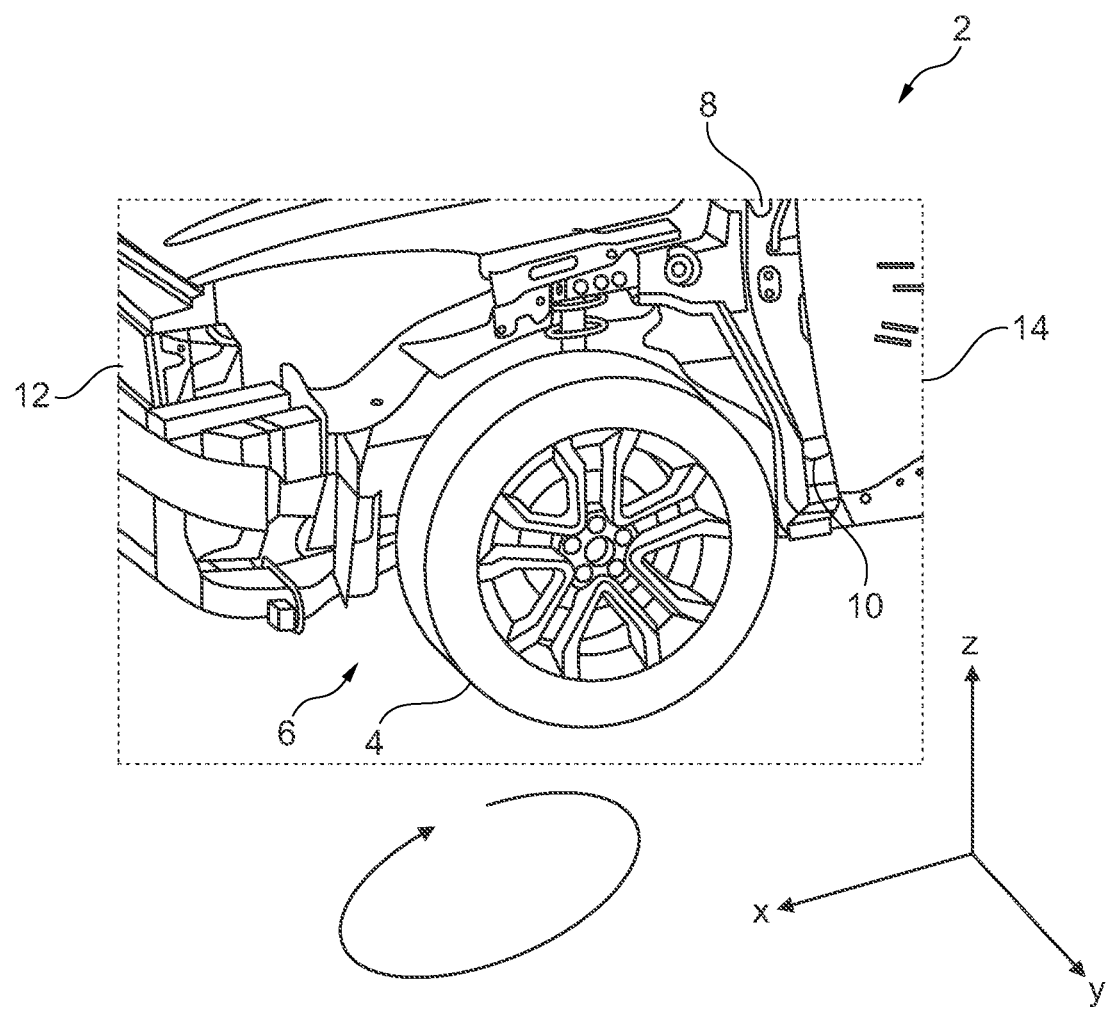
FIG. 1 shows a diagrammatic illustration of one section of a motor vehicle.

Reference is made first of all to FIG. 1.

A section of a motor vehicle 2 (of a passenger car in the present exemplary embodiment) is shown, in the region of a wheel 4 of the motor vehicle 2. This is a left-hand front wheel in the present exemplary embodiment. The following comments also apply analogously to a right-hand front wheel of the motor vehicle 2.

The wheel 4 is received in a wheel arch 6 (also called a wheel housing) of the motor vehicle 2, which wheel arch 6 is delimited, inter alia, by a wing 12 of the motor vehicle 2.

In the case of a partial overlap crash, such as, for example, in accordance with the SORB (Small Overlap Rigid Barrier) IIHS protocol with its prescribed overlap, it is provided in accordance with the present exemplary embodiment that the wheel 4 rotates out of the wheel arch 6 in accordance with the SORB protocol. In other words, it is provided in accordance with the strategy for the reduction of accident damage that the wheel 4 is moved out of its wheel arch 6, in order thus to optimize the evaluations to be achieved in accordance with the IIHS protocol of structure measurement points and occupant values.

In the present exemplary embodiment, the wheel 4 is rotated in the clockwise direction about a vehicle vertical axis z. If, in contrast, the wheel 4 is the right-hand front wheel of the motor vehicle 2, it is rotated analogously counter to the clockwise direction about the vehicle vertical axis z.

A door hinge 10 of a vehicle door 14, for example, can be damaged here, for example by being sheared off by the wheel 4.

In order to avoid shearing off of this type, a crash structure 16 of the motor vehicle 2 will now be described with additional reference to FIGS. 2 and 3.

In the present exemplary embodiment, the crash structure 16 has a fastening section 18, a connecting section 20 and a deflector section 22.

In the present exemplary embodiment, the crash structure 16 is configured in one piece and from one material, for example from metal. In a deviation from the present exemplary embodiment, the crash structure 16 can also be manufactured in multiple pieces and/or from a plurality of materials.

In the present exemplary embodiment, the crash structure 16 is fastened to the motor vehicle 2 by way of the fastening section 18, for example by way of welding, to be precise to an A-pillar 8 of the motor vehicle 2 in the present exemplary embodiment.

The connecting section 20 connects the fastening section 18 to the deflector section 22.

The deflector section 22 can be considered to be a distal or free end of the crash structure 16.

The connecting section 20 is configured, after a SORB partial overlap crash, to be deformed without tools by way of the wheel 4, whereas the deflector section 22 is configured to form a deflector surface for deflecting the wheel 4, as will be described in detail later.

Figure 2:
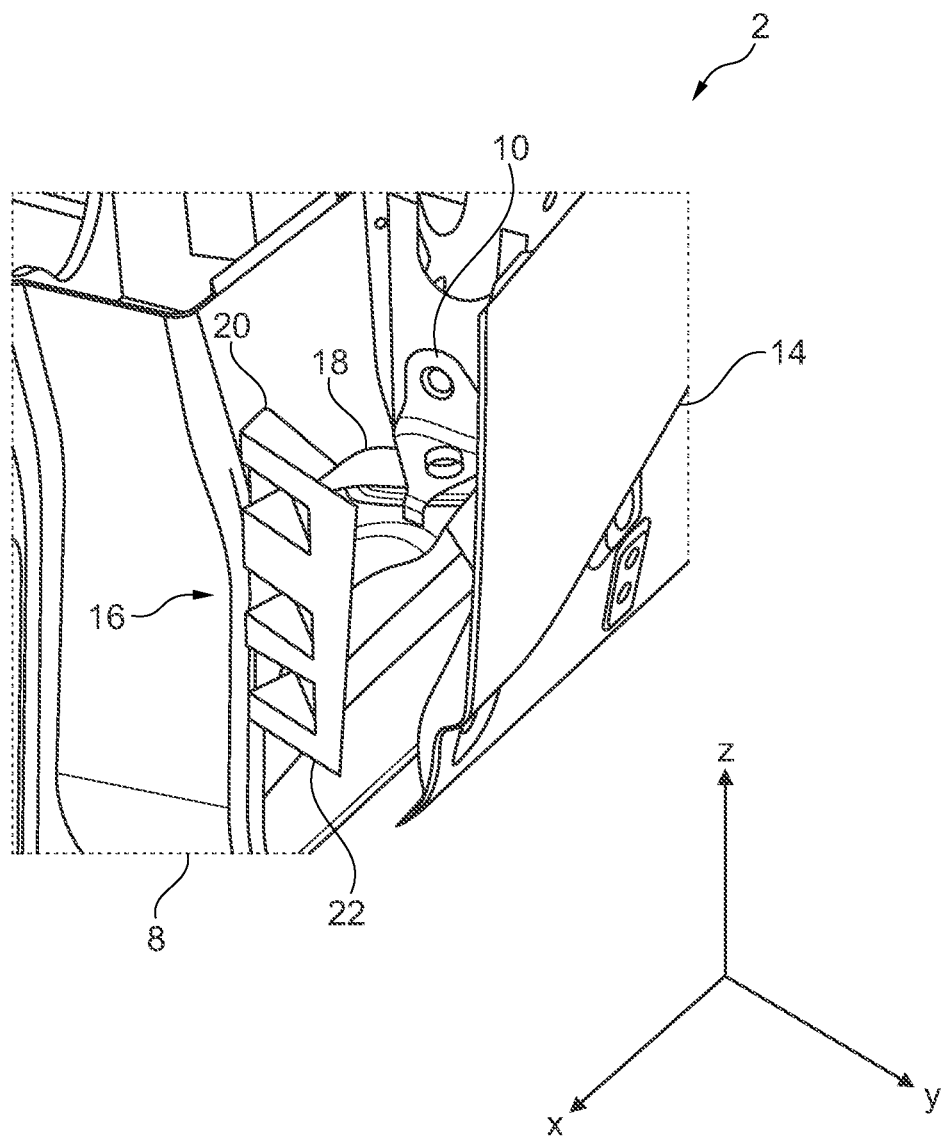
FIG. 2 shows a diagrammatic illustration of a crash structure in a starting state.
Figure 3:
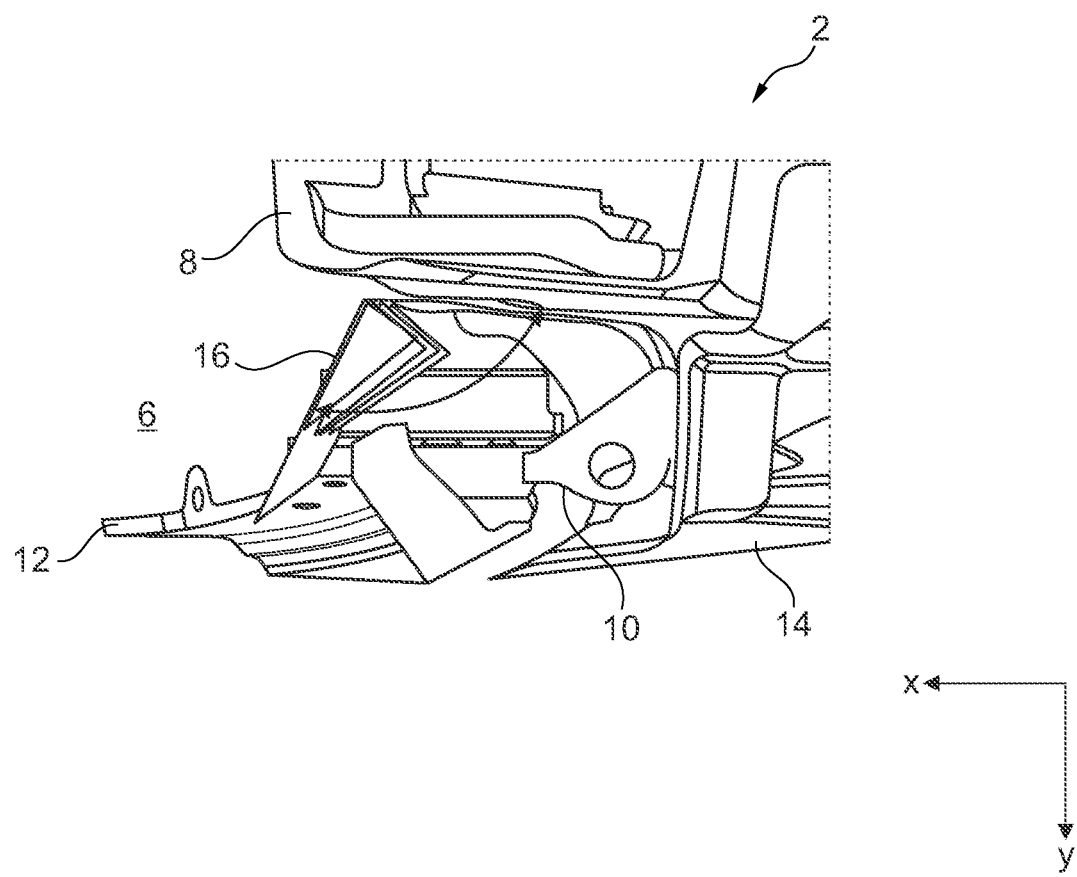
FIG. 3 shows a further diagrammatic illustration of the crash structure shown in FIG. 2 in the starting state.

In the starting state which is shown in FIGS. 2 and 3, the crash structure 16, in particular the deflector section 22, is at a predefined minimum spacing of greater than zero from the door hinge 10 of the vehicle door 14 of the motor vehicle 2.

Furthermore, the crash structure 16, in particular the deflector section 22, extends substantially toward the outside in the vehicle width direction y of the motor vehicle 2. In other words, the deflector section 22 has a parallelepiped-shaped basic shape and extends along one of its main directions of extent toward the outside in the direction of the vehicle width direction y of the motor vehicle 2.

In the present exemplary embodiment, furthermore, the crash structure 16 is arranged, in its starting state, at an angle of from 100° 130° in relation to the A-pillar 8. As can be seen on the basis of FIG. 3, the A-pillar 8 configures a plane on the outer side of the vehicle in sections, the perpendicular vector of which plane extends substantially in the vehicle width direction y.

As a result of said arrangement, sufficient installation space for proper functioning of the door hinge 10 is provided. Therefore, the installation space which is formed by way of the angle of from 100° to 130° remains free from components, that is to say it is component-free.

In the present exemplary embodiment, furthermore, the deflector section 22 of the crash structure 16 has three spacer elements 24 with a basic shape which is frustoconical in the present exemplary embodiment, which spacer elements 24 in each case have a main direction of extent, which main directions of extent extend substantially in the vehicle longitudinal direction x in the starting state. In a deviation from the present exemplary embodiment, the number of spacer elements 24 can also be different.

In the present exemplary embodiment, the crash structure 16 adjoins the wheel arch 6 and is separated from the latter merely by way of a wheel arch trim panel without any mechanical function. In other words, the wheel arch trim panel is not an obstacle for a wheel 4 and, in the case of a crash, also does not impart a preferential direction to said wheel 4.

Figure 4:
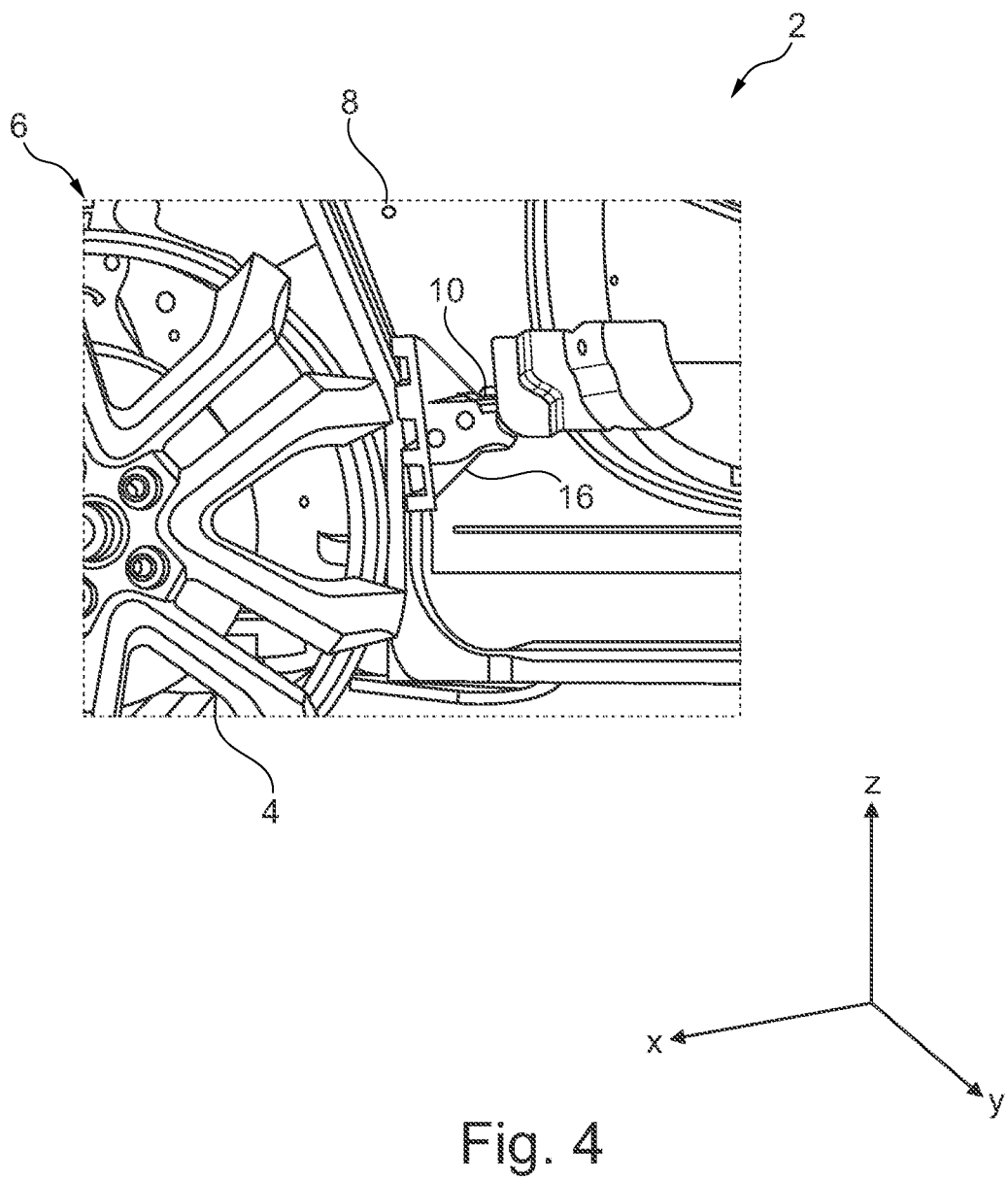
FIG. 4 shows a diagrammatic illustration of a crash structure in a crash state.
Figure 5:
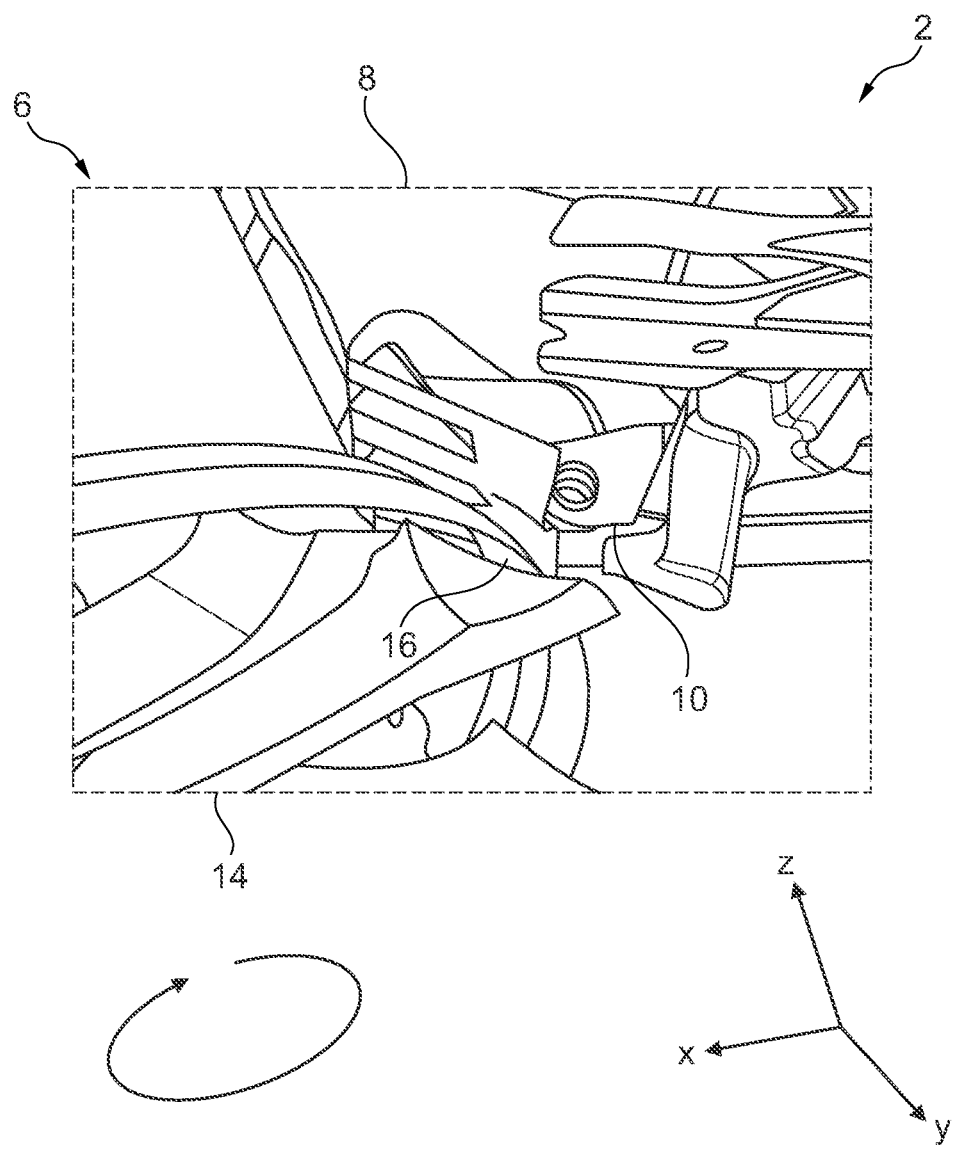
FIG. 5 shows a further diagrammatic illustration of the crash structure shown in FIG. 4 in the crash state.

Reference will now additionally be made to FIGS. 4 and 5.

The crash structure 16 is shown in a crash state after a partial overlap crash. Here, starting from the starting state, the wheel 4 has been moved substantially in the vehicle longitudinal direction x through the wheel arch 6 during a first phase, until the wheel 4 strikes the crash structure 16, in particular on the deflector section 22, and is then in contact with the latter.

In a second phase, the deflector section 22 together with the wheel arch trim panel is then deformed without tools by the wheel 4. In other words, there is an operative connection from the wheel 4 by way of the wheel arch trim panel to the deflector section 22. In the present exemplary embodiment, the deflector section 22 then carries out a pivoting movement about a vehicle vertical axis z of the motor vehicle 2. In the present exemplary embodiment, the pivoting movement can comprise an angular range of from 50° to 80°. At the end of the second phase, the crash structure 16, in particular the deflector section 22, bears against the at least one contact section of the door hinge 10.

In a third phase, the wheel 4, if it is moved further in the vehicle longitudinal direction x, is then rotated laterally out of the wheel arch 6 by the deflector section 22, to be precise in the clockwise direction about a vehicle vertical axis z in the present exemplary embodiment. A penetration of the wheel 4 into the passenger compartment of the motor vehicle 2 is thus prevented. Therefore, a deflection or diversion of the wheel 4 takes place, but not stopping of the movement of the wheel 4.

Figure 6:
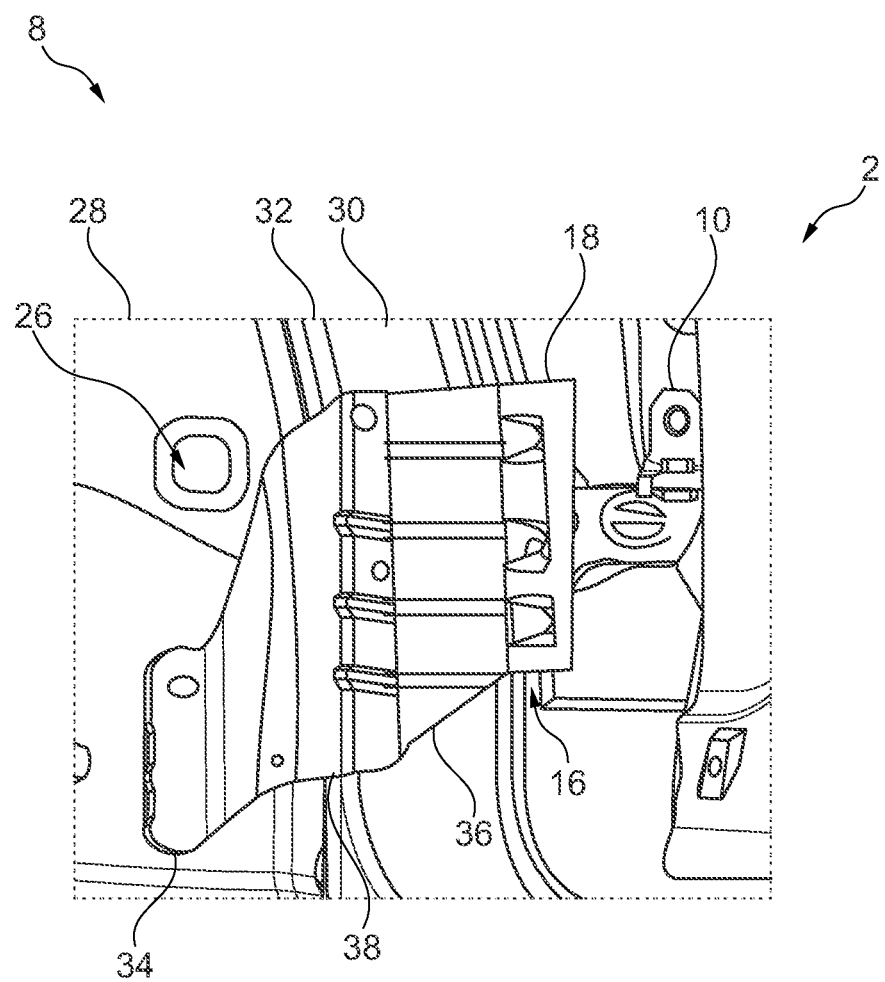
FIG. 6 shows a diagrammatic illustration of a bracket element which connects two parts with a crash structure.
Figure 7:
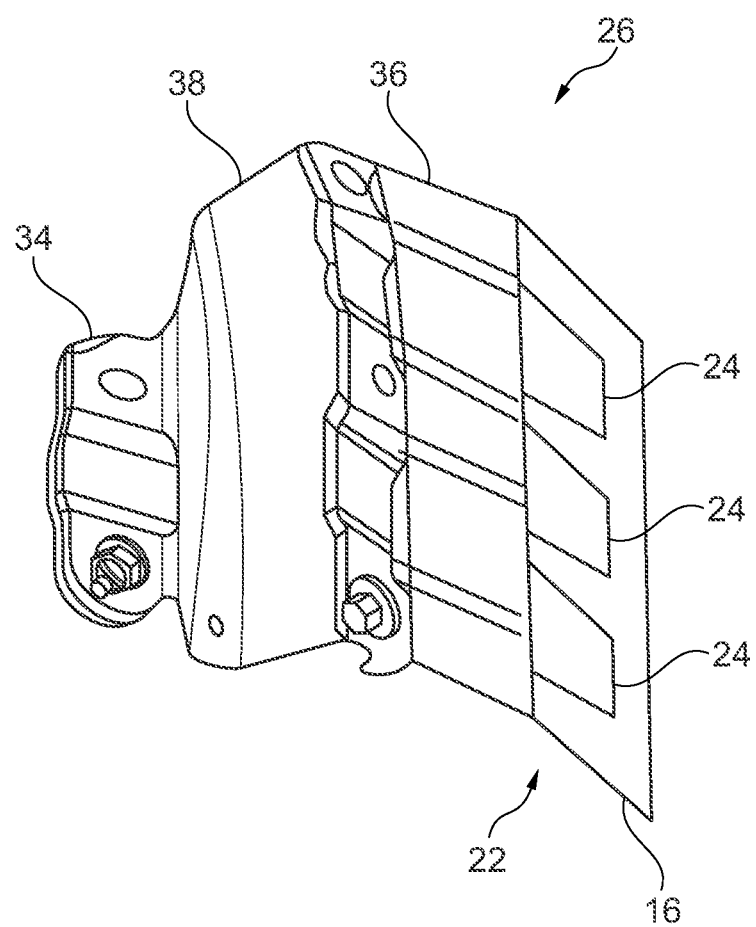
FIG. 7 shows a diagrammatic perspective illustration of the bracket element which is shown in FIG. 6.
Figure 8:
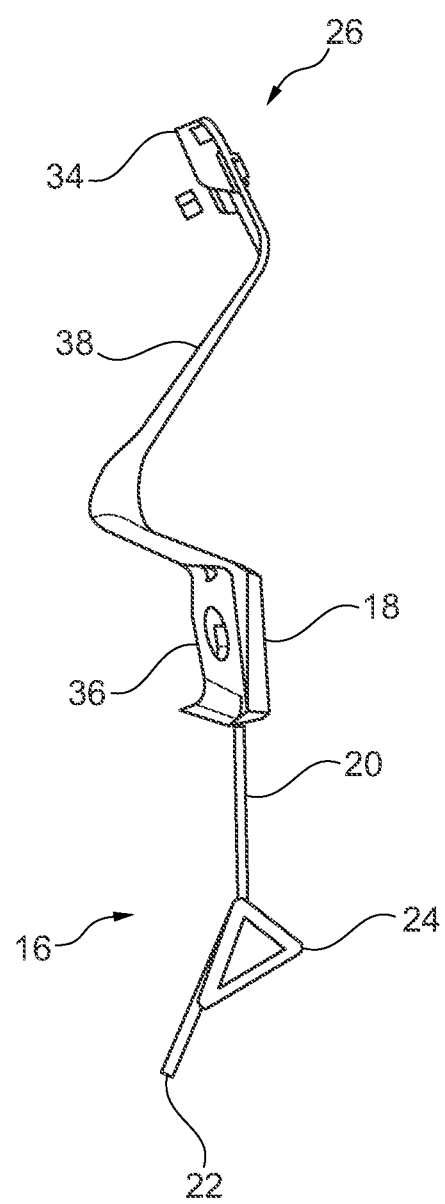
FIG. 8 shows a further diagrammatic illustration of the bracket element which is shown in FIG. 7.

Reference is now additionally made to FIGS. 6 to 8.

A bracket element 26 is shown which, in the present exemplary embodiment, is configured to connect a first, inner-side section 28 to a second, outer-side section 30 of the A-pillar 8 and in the process to bridge a flange 32.

In the present exemplary embodiment, the bracket element 25 is configured in one piece and from one material, for example from metal. In a deviation from the present exemplary embodiment, the bracket element 26 can also be manufactured in multiple pieces and/or from a plurality of materials.

To this end, in the present exemplary embodiment, the bracket element 26 has a first section 34 and a second section 36, and a connecting section 38 which connects the first section 34 to the second section 36.

Here, the first section 34 of the bracket element 26 is configured for the connection to the first, inner-side section 28 of the A-pillar 8, and the second section 36 of the bracket element 26 is configured for the connection to the second, outer-side section 30 of the A-pillar 8, for example by way of screwing.

The crash structure 16 is joined to the second section 36 of the bracket element 26 in such a way that, in the present exemplary embodiment, the second section 36 of the bracket element 26 is connected to the fastening section 18 of the crash structure 16.

The connection between the first, inner-side section 28 and the second, outer-side section 30 of the A-pillar 8 is thus protected by way of the bracket element 26, whereas the crash structure 16 protects the door hinge 10 in the case of a crash, as described above.

LIST OF REFERENCE SIGNS

2 Motor vehicle
4 Wheel
6 Wheel arch
8 A-pillar
10 Door hinge
12 Wing
14 Vehicle door
16 Crash structure
18 Fastening section
20 Connecting section
22 Deflector section
24 Spacer element
26 Bracket element
28 First section
30 Second section
32 Flange
34 First section
36 Second section
38 Connecting section
x Vehicle longitudinal direction
y Vehicle width direction
z Vehicle vertical axis

The invention claimed is:
1. A vehicle, comprising:
a vehicle body;
a door hinge;
a crash structure fastened to the vehicle body and deformable relative to the door hinge from a starting state to a crash state;
the crash structure having a deflector section having a free end spaced from the door hinge in the starting state, the deflector section being pivotable relative to the door hinge; and a spacer element protruding from the deflector section, the spacer element being spaced from the hinge pillar in the starting state and abutting the door hinge in the crash state.

2. The vehicle as set forth in claim 1, wherein the deflector is pivotable about a vertical axis.

3. The vehicle as set forth in claim 1, wherein the spacer protrudes from the deflector section in a vehicle-rearward direction.

4. The vehicle as set forth in claim 3, wherein the deflector is pivotable about a vertical axis.

5. The vehicle as set forth in claim 4, further comprising a second spacer element vertically spaced from the spacer element.

6. The vehicle as set forth in claim 1, further comprising a second spacer element vertically spaced from the spacer element.

7. The vehicle as set forth in claim 6, further comprising a third spacer element vertically spaced from the spacer element and the second spacer element.

8. The vehicle as set forth in claim 1, further comprising a fastening structure fastened to the vehicle body and a connecting section connecting the deflector section to the fastening structure, the connecting section being deformable from the starting state to the crash state.

9. The vehicle as set forth in claim 1, wherein the crash structure is one piece.

10. The vehicle as set forth in claim 1, wherein the deflector section extends from the vehicle body in a vehicle-outboard direction.

11. The vehicle as set forth in claim 1, wherein the deflector section extends substantially in a cross-vehicle direction in the starting state.

12. The vehicle as set forth in claim 1, further comprising a wheel arch, the crash structure being in the wheel arch.

13. The vehicle as set forth in claim 1, further comprising a bracket element connecting the deflector section to the vehicle body.

14. A vehicle, comprising:
 a vehicle body;
 a wheel arch;
 a door hinge;
 a crash structure fastened to the vehicle body and disposed in the wheel arch;
 the crash structure being deformable relative to the door hinge from a starting state to a crash state;
 the crash structure having a deflector section having a free end spaced from the door hinge in the starting state;
 the deflector section extending from the vehicle body to the free end in a vehicle-outboard direction in the starting state and the deflector section being pivotable relative to the door about a vertical axis; and
 a spacer element protruding from the deflector section in a vehicle-rearward direction, the spacer element being spaced from the hinge pillar in the starting state and abutting the door hinge in the crash state.

15. The vehicle as set forth in claim 14, further comprising a second spacer element vertically spaced from the spacer element.

* * * * *